(12) United States Patent
Rodier

(10) Patent No.: US 6,588,398 B1
(45) Date of Patent: Jul. 8, 2003

(54) AUTOMATED ELECTRONIC TRIM FOR A FUEL INJECTOR

(75) Inventor: William J. Rodier, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 15 days.

(21) Appl. No.: 10/024,428

(22) Filed: Dec. 18, 2001

(51) Int. Cl.[7] ........................ G01M 15/00; F02M 51/00
(52) U.S. Cl. ....................... 123/299; 123/490; 701/114; 73/119 A
(58) Field of Search ................... 73/119 A; 123/299, 123/490; 701/114, 104

(56) References Cited

U.S. PATENT DOCUMENTS

| | | | | |
|---|---|---|---|---|
| 4,379,332 A | * | 4/1983 | Busser et al. ............... 701/104 |
| RE33,890 E | * | 4/1992 | Ohnari et al. ............... 123/490 |
| 5,204,816 A | * | 4/1993 | Wright et al. ............... 701/114 |
| 6,112,720 A | * | 9/2000 | Matta ...................... 73/119 A |
| 6,189,378 B1 | | 2/2001 | Kendrick et al. | |
| RE37,807 E | * | 7/2002 | Shinogle et al. .......... 73/119 A |
| 2002/0148441 A1 | * | 10/2002 | Tuken ..................... 73/119 A |

* cited by examiner

Primary Examiner—Erick Solis
(74) Attorney, Agent, or Firm—Mike Huber

(57) ABSTRACT

A method and apparatus for trimming a fuel injector that delivers multiple injections or injection segments per engine cycle is provided. Trimming a fuel injector comprises determining a first fuel quantity to be delivered by the plurality of injectors, partially suspending fuel delivery by one selected injector, determining a second fuel quantity, and determining a fuel characteristic of the selected injector in response to the first and second fuel quantities.

17 Claims, 1 Drawing Sheet

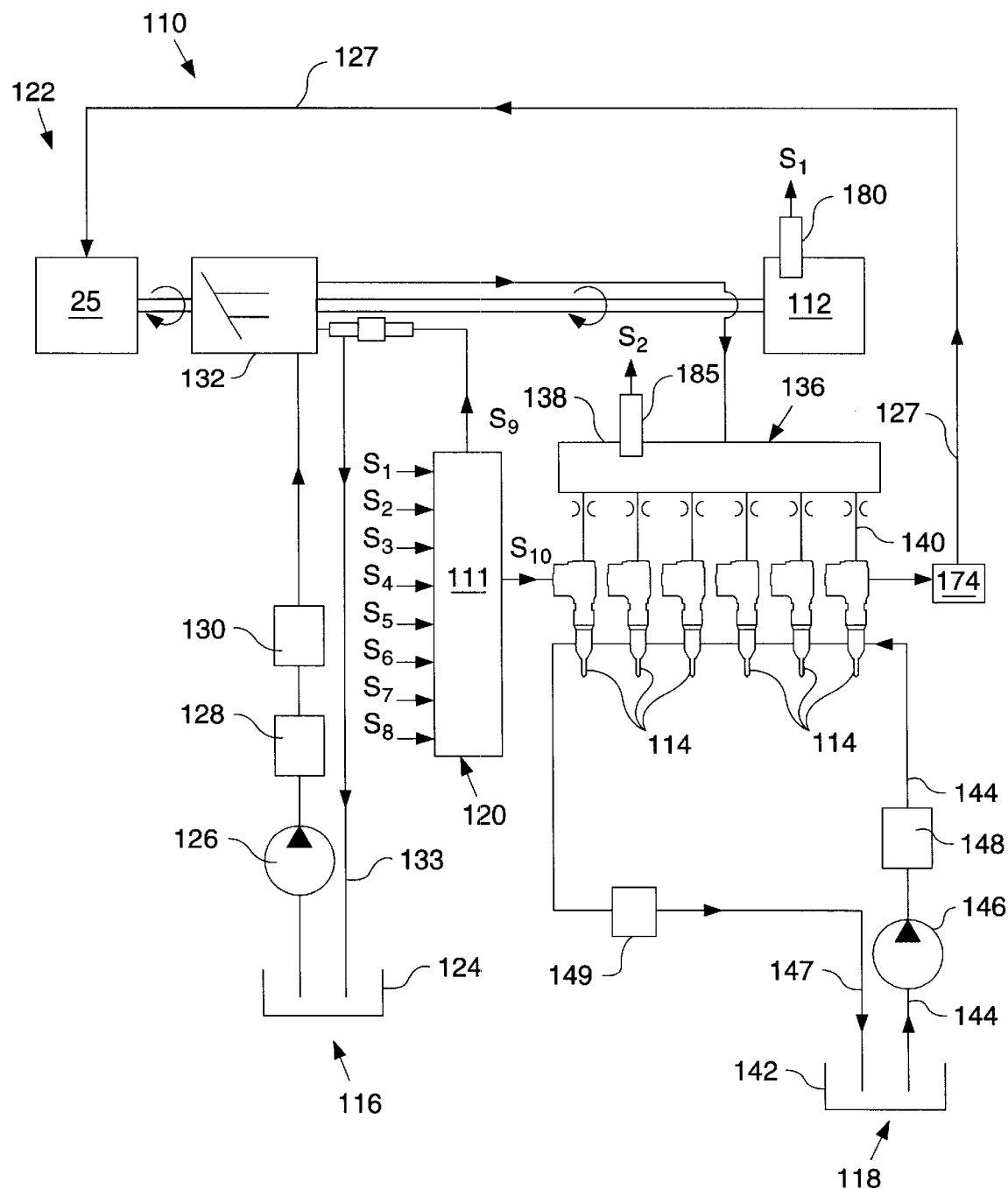

AUTOMATED ELECTRONIC TRIM FOR A FUEL INJECTOR

TECHNICAL FIELD

The present invention is directed to a fuel control system and specifically to a method and apparatus for trimming a multiple injection fuel injector.

BACKGROUND

Emissions continue to drive fuel injector design and performance. As emissions standards continue to increase it becomes ever more important to control the fuel injector and the quantity of fuel being injected with great precision; however, precise control of injectors is difficult because manufacturing variation and wear can make each injector operate slightly different. In other words, although two injectors may receive the same injection signal, they may inject different amounts of fuel. This can then change expected combustion performance and generate more emissions than desired.

One method to overcome injector to injector variation has been to trim individual injectors. In one method of trimming, an injector's performance profile is determined after assembly and prior to installation in an engine. The performance profile is then provided to the engine's electronic control module (ECM), which takes that performance profile in to account when sending signals to the injector. The problem with this type of trimming is that it does not account for wear variations after the injector has been in use for a period of time. In another method of trimming, disclosed in U.S. Pat. No. 6,189,378 B1, to Kendrick et al., an injector can be trimmed in an engine by using a cylinder cut out method. In this method, one injector is shut off completely during engine operation, and its fuel delivery is determined by examining what the other injectors needed to do to compensate for the loss of the one injector. Although this exemplary method of trimming provides good results, injection schemes have become more complicated. Specifically, injectors are now injecting several times during an engine cycle and it is necessary to trim each injection event but the cylinder cut out method completely suspends the injector and therefore, individual injection events by the injector can not be distinguished.

The present invention is directed to overcoming one or more of the problems set forth above.

SUMMARY OF THE INVENTION

In one embodiment of the present invention, a method of trimming a fuel injector comprises the steps of determining a first fuel quantity to be delivered by a plurality of fuel injectors, delivering fuel injection signals to the plurality of injectors delivering a first fuel quantity wherein at least one of the plurality of injectors receives multiple injection segment signals per engine cycle, partially suspending fuel delivery by one of the plurality of injectors receiving multiple injection segment signals by suspending at least one of the multiple injection segment signals, determining the second fuel quantity to be delivered by the plurality of injectors in response to the suspending step, and determining a performance characteristic of the partially suspended injector in response to the first and second fuel quantities.

In the second embodiment of the present invention, a method of trimming fuel injectors comprises the steps of: injecting in a first mode wherein each injector receives a specific first quantity of fuel, determining a first total quantity of fuel injected by the plurality of injectors, selecting one injector from the plurality of injectors and injecting in the second mode, wherein the specific second quantity of fuel is less than the specific first quantity of fuel, determining a second total quantity of fuel injected by the plurality of injectors in response to the selected step, and determining a performance characteristic of said selected injector in response to the first total quantity and second total quantity of fuel.

In a third embodiment of the present invention, a system for trimming a fuel injector comprises a plurality of fuel injectors, an engine performance center adapted to measure an engine performance characteristic, and a controller adapted to receive a signal from the performance sensor, send multiple injection signals to the plurality of fuel injectors, determine the first fuel quantity injected by the plurality of injectors, suspend at least one of the multiple injection signals to partially suspend fuel delivery by one of a plurality of injectors, adjust the first fuel quantity to a second fuel quantity in order to maintain an engine performance characteristic at a relatively constant level, determine the second fuel quantity injected by the plurality of injectors, compare the first and second fuel quantities and determine a performance characteristic of the partially suspended injector.

BRIEF DESCRIPTION OF THE DRAWINGS

FIG. 1 is a schematic of a fuel injection system.

DETAILED DESCRIPTION

Referring to FIG. 1, there is shown an embodiment of a hydraulically-actuated electronically-controlled fuel injection system 110 in an example configuration as adapted for a direct-injection diesel-cycle internal combustion engine 112. Fuel system 110 includes one or more hydraulically-actuated electronically-controlled fuel injectors 114, positioned in a respective cylinder head bore (not shown) of engine 112. Fuel system 110 includes a first source of pressurized fluid flow 116 for supply of actuating fluid to each injector 114, a second source of pressurized fluid flow 118 for supplying fuel to each injector, a computer 120 for electronically controlling the fuel injection system and an apparatus 122 for re-circulating actuation fluid leaving each of the injectors.

The first fluid source 116 preferably includes an actuating fluid sump 124, a relatively low pressure actuating fluid transfer pump 126, an actuating fluid cooler 128, one or more actuation fluid filters 130, a high pressure pump 132 for generating relatively high pressure in the actuation fluid and at least one relatively high pressure actuation fluid manifold 136. A common rail passage 138 is arranged in fluid communication with the outlet from the relatively high pressure actuation fluid pump 132. A rail branch passage 140 connects the actuation fluid inlet of each injector 114 to the high pressure common rail passage 138.

Actuation fluid leaving an actuation fluid drain of each injector 114 enters a re-circulation line 127 that carries the same to the actuation fluid recirculating apparatus 122. A portion of the re-circulated actuation fluid is channeled to high pressure actuation fluid pump 132 and another portion is returned to actuation fluid sump 124 via re-circulation line 133.

In a preferred embodiment, the actuation fluid is engine lubricating oil and the actuation fluid sump 124 is an engine lubrication oil sump. This allows the fuel injection system to be connected as a parasitic subsystem to the engine's lubricating oil circulation system.

The second fluid source 118 preferably includes a fuel tank 142, a fuel supply passage 144 arranged in fluid communication between fuel tank 142 and the fuel inlet of each injector 114, a relatively low pressure fuel transfer pump 146, one or more fuel filters 148, a fuel supply regulating valve 149, and a fuel circulation and return passage 147 arranged in fluid communication between injectors 114 and fuel tank 142.

The computer 120 preferably includes an electronic control module (ECM)111 including a microprocessor and memory. As is known to those skilled in the art, the memory is connected to the microprocessor and stores an instruction set and variables. Associated with the microprocessor and part of the electronic control module 111 are various other known circuits such as power supply circuitry, signal conditioning circuitry and solenoid driver circuitry, among others. The electronic control module 111 controls 1) the fuel injection timing; 2) the total fuel injection quantity during an injection cycle; 3) the fuel injection pressure; 4) the number of separate injections or injection segments during each injection cycle; 5) the time intervals between the injection segments; 6) the fuel quantity of each injection segment during an injection cycle; 7) the actuation fluid pressure; 8) current level of the injector waveform; and 9) any combination of the above parameters. Computer 120 receives a plurality of sensor input signals S1–S8, which correspond to known sensor inputs, such as engine operating conditions including engine speed, engine temperature, pressure of the actuation fluid, load on the engine, etc., as well as desired operating conditions such as desired engine speed, that are used to determine the precise combination of injection parameters for a subsequent injection cycle.

For example, an engine temperature sensor 180 is shown connected to the engine 112. In one embodiment, the engine temperature sensor includes an engine oil temperature sensor. However, an engine coolant temperature sensor can also be used to detect the engine temperature. The engine temperature sensor produces a signal designated by S1 in FIG. 1 and is input to the computer 120 over line S1. Another example of an engine sensor input is a rail pressure sensor 185 shown connected to the high pressure common rail passage 138 for producing a high pressure signal S2 responsive to the pressure of the actuating fluid. The electronic control module 111 inputs the high pressure signal on input S2.

In this example, computer 120 issues control signal S9 to control the actuation fluid pressure and a fuel injection signal S10 to energize a solenoid within a fuel injector thereby controlling fluid control valve(s) within each injector 114 and causing fuel to be injected into a corresponding engine cylinder. Each of the injection parameters are variably controllable, independent of engine speed and load. In the case of injector 114, control signal S10 is a fuel injection signal that is a computer commanded current to the injector solenoid.

Fuel injectors 114 are capable of multiple injections or injection segments per engine cycle. As stated previously, the ECM 111 controls when, duration and number of injections or segments for each injector 114 per engine cycle. Multiple injections or injection segments are well know in the art and may include pilots, mains, posts, and anchors.

In order to obtain desired engine performance and emissions, it is necessary to understand how the injector 114 is operating and adjust or trim the injector's 114 operation as necessary. The problem of trimming an injector has been complicated due to the numerous injections or segments that may occur per engine cycle. Each injection segment needs to be trimmed; therefore a complete cylinder cut out approach will not work because it is not possible to differentiate between injection segments. In one embodiment of the present invention, each injection segment can be trimmed individually while the injectors are operating in the engine.

In order to trim each injection segment, it is first necessary to determine the total quantity of fuel being injected by the injectors 114. This is simply done by summing the quantity of fuel from all injection segments for each injector 114. Once the total quantity of fuel is know, the ECM 111 picks an engine characteristic, preferably engine speed, to remain constant. The ECM 111 then selects one injector 114 and partially suspends fuel delivery. This is done by suspending one of injection segments, such as the pilot or post. Partially suspending injection will then impact engine performance. The ECM 111 then proceeds to alter the injection profile for the remaining injectors 114 in order to maintain constant engine performance. For example, the ECM 111 may increase fuel delivery to the remaining injectors to compensate for the lost fuel from the partially suspended injector in order to maintain engine speed.

The ECM 111 then determines what the new fuel quantity is and from this, the ECM 111 can determine the amount of fuel that was being injected by the selected injector 114 until fuel delivery was partially suspended. This can be done by comparing the first total fuel quantity to the second total fuel quantity and understanding the relationship between the quantity of fuel injected, the injection profile, and specific engine performance. Once the ECM 111 knows the amount of fuel that was injected by the suspended injection segment, it can then compare that quantity of fuel with what was expected to be delivered based upon the ECM's 111 injection signal S10. If a difference exists, the ECM 111 can then adjust or trim the injection signal S10 appropriately.

INDUSTRIAL APPLICABILITY

Initially, ECM 111 sends an injection signal S10 to injectors 114. This signal may include multiple injections or injection segments for each injector per engine cycle. The initial injection signals S10 sent to each injector 114 are designed to inject a desired quantity of fuel. Due to manufacturing variation and injector wear, the exact amount of fuel injected may differ from the desired amount. In order to enhance engine performance and reduce emissions, the fuel injector 114 needs to be trimmed—the injection signal S10 needs to be altered for each specific injector to compensate for variations from injector to injector and injection segment to injection segment.

In order to trim a fuel injector, the ECM 111 must first determine the total quantity of fuel being injected for a given operational load. The ECM 111 then partially suspends injection by selecting one injector 114 and suspending an injection segment for that injector 114. The suspended injection segment could be any segment, including the pilot, main, post, or anchor. After suspending the selected injection segment, the ECM 111 monitors engine performance and compensates for the lost quantity of fuel injected by altering the injection profile of the remaining injectors 114 in order to maintain the operational load. For example, the ECM 111 can monitor engine speed through one of its sensors S1–8. An initial engine speed is determined prior to partially suspending and injector 114. After suspending an injection segment on a selected injector 114, the ECM maintains that engine speed by increasing the fuel quantity injected by the remaining injectors.

The ECM 114 then compares the first fuel quantity to the new fuel quantity to determine the amount of fuel injected by the suspended injection segment. This is done based upon the relationship of quantity of fuel injected, injection profiles, and engine performance. The ECM 111 then computes the actual fuel injected by the suspended injection segment to the desired quantity of fuel. If the quantities are not equal, the ECM 111 knows that the selected injector 114 is operating differently than expected and takes this in to account the next time it sends an injection signal S10 to the injector 114. For example if it was learned that the injection segment of the selected injector was injecting less fuel than desired, the ECM 111 could change the duration of injection signal S10 sent to the injector 114, for that injection segment, to increase the quantity of fuel injected.

The trimming method disclosed can be applied in a variety of manners. First, each injection segment can be independently trimmed. Second, various engine loads can be used. For example, the trimming could be done at idle, or could be performed with an engine at load. In order to have an engine at load, the vehicle would need to be moving, use an engine component, such as a engine compression release brake to place a load on the vehicle, or use a chassis dyno or cell dyno if the injectors are not in a vehicle. Further, the description provided described hydraulically actuated, electronically controlled fuel injectors; however, the trimming methods described would be equally applicable to other types of fuel systems and injectors, including common rail and mechanically actuated injectors. Finally, the present specification talks about injector operation and suspending injections. It is also possible to view the injectors in the present application as injecting in different modes. The injector injects in a first mode LIST OF ELEMENTS
TITLE: Automated Electronic Trim for a Fuel Injector
FILE: 01-211
110 fuel injection system
111 electronic control module
112 internal combustion engine
114 fuel injectors
116 means for supplying actuator fluid
118 means for supplying fuel
120 computer
122 means for re-circulating actuation fluid
123 actuating fluid sump
124 actuating fluid transfer pump
126 re-circulation line
128 actuating fluid cooler
130 actuating fluid filter
132 high pressure pump
133 re-circulation line
136 actuation fluid manifold
138 common rail passage
140 rail branch passage
142 fuel tank
144 fuel supply passage
146 transfer pump
147 return passage
148 fuel filter
149 regulating valve
180 engine temperature sensor
185 rail pressure sensor
when all of the injections are occurring and injects in a second mode when one of the injection segments is eliminated or the quantity of fuel injected in altered.

Other aspects, features, and advantages of the present invention may be obtained from a study of this disclosure and the drawings, along with the appended claims.

What is claimed is:

1. A method of trimming a fuel injector comprising the steps of:
    determining a first fuel quantity to be delivered by a plurality of fuel injectors;
    delivering fuel injection signals to said plurality of fuel injectors to deliver said first fuel quantity wherein at least one of said plurality of injectors receives multiple injection segment signals per engine cycle;
    partially suspending fuel delivery by one of said plurality of injectors receiving multiple injection segment signals by suspending at least one of said multiple injections segment signals;
    determining a second fuel quantity to be delivered by said plurality of injectors in response to said suspending step;
    determining a performance characteristic of said partially suspended injector in response to said first and said second fuel quantities.

2. The method of claim 1 wherein delivering multiple injection segment signal includes delivering a pilot injection signal.

3. The method of claim 1 wherein delivering multiple injection segment signal includes delivering a post injection signal.

4. The method of claim 1 wherein delivering multiple injection segment signal includes delivering an anchor injection signal.

5. The method of claim 1 wherein the step of determining said performance characteristic of said partially suspended injector further comprises:
    comparing said first and said second fuel quantities; and
    determining a fuel offset to be applied to said partially suspended injector in response to said comparison.

6. The method of claim 5 further comprising applying said fuel offset to said suspended multiple injection signal.

7. The method of claim 1 wherein the step of determining said performance characteristic of said partially suspended injector further comprises:
    comparing said first and said second fuel quantities; and
    determining a fuel quantity delivered by said suspended multiple injection signal of said partially suspended injector in response to said comparing step.

8. The method of claim 1 further comprising:
    determining an engine speed related to said first fuel quantity;
    adjusting said first fuel quantity to said second fuel quantity in order to maintain said engine speed after said suspending step;
    comparing said first fuel quantity and said second fuel quantity;
    determining a fuel offset for said partially suspended injector in response to said comparing step.

9. The method of claim 1 further comprising activating fully said partially suspended injector.

10. A method of trimming fuel injectors within a system, comprising a plurality of fuel injectors, comprising the steps of:
    injecting in a first mode wherein each injector of said plurality of injectors injects a first predetermined quantity of fuel;
    determining a first predetermined total quantity of fuel injected by said plurality of injectors;
    selecting one injector from said plurality of injectors and injecting in a second mode, wherein a specific second quantity of fuel is less than said specific first quantity of fuel;

determining a second total quantity of fuel injected by said plurality of injectors in response to said selecting step; and determining a performance characteristic of said selected injector in response to said first and said second total quantities of fuel.

11. The method of claim 10 wherein said first mode includes injecting with at least two injections per engine cycle.

12. The method of claim 10 wherein said second mode includes injecting with at least one less injection per engine cycle than said first mode.

13. The method of claim 10 wherein the step of determining a performance characteristic of said selected injector further comprises the steps of:

comparing said first and said second total quantities of fuel; and determining a fuel offset to be applied to said selected injector in response to said comparing step.

14. The method of claim 10 wherein the step of determining a performance characteristic of said selected injector further comprises the steps of:

comparing said first and said second total quantities of fuel; and determining a fuel quantity delivered by said selected injector in response to said comparing step.

15. The method of claim 10 further comprising the steps of:

determining an engine speed related to said first total quantity of fuel;

adjusting said first total fuel quantity to said second total fuel quantity in order to maintain said engine speed after said selecting step;

comparing said first total fuel quantity to said second total fuel quantity; and determining a fuel offset for said selected injector.

16. A system for trimming a fuel injector comprising:

a plurality of fuel injectors;

an engine performance sensor adapted to measure an engine performance characteristic; and a controller adapted to receive a signal from said engine performance sensor, send multiple injection signals to each of said plurality of fuel injectors, determine a first fuel quantity injected by said plurality of injectors, suspend at least one of said multiple injection signals to partially suspend fuel delivery of one of said plurality of injectors, adjust said first fuel quantity to a second fuel quantity in order to maintain said engine performance characteristic at a relatively constant level, determine said second fuel quantity injected by said plurality of injectors; compare said first and said second fuel quantities, and determine a performance characteristic of said partially suspended injector.

17. The system of claim 16 wherein said engine performance characteristic is engine speed.

* * * * *